United States Patent Office 3,238,811
Patented Mar. 8, 1966

3,238,811
COMPOSITE CONNECTING ROD
William G. Longstreth, Oakland, Mich., assignor to Ford Motor Company, Dearborn, Mich., a corporation of Delaware
Filed Feb. 20, 1963, Ser. No. 259,977
3 Claims. (Cl. 74—579)

This invention is directed to a composite connecting rod for use in internal combustion engines. This invention is particularly directed to a composite connecting rod which may be constructed to employ a minimum weight of metal without the sacrifice of any essential strength or durability. This connecting rod is designed to combine the excellent compression supporting characteristics of easily castable metals such as aluminum and zinc and their alloys with the equally excellent dependability under tension of wrought steel wire.

Figure 1:
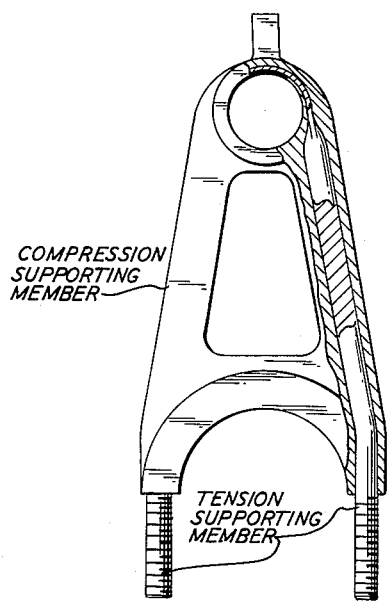
Figure 2:
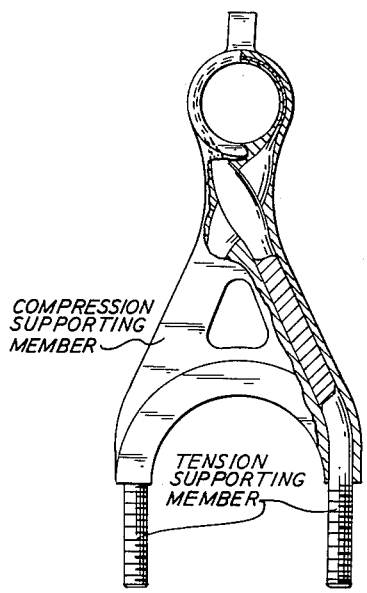

This invention may be readily understood by reference to the drawings in which:

FIGURE 1 is a plan view partially broken away of one form of the invention; and, FIGURE 2 is a similar plan view partially broken away of an alternative form of the invention.

Connecting rods in modern high speed internal combustion engines are highly stressed members. Due to the necessity of maintaining engine balance, it is essential that all of the reciprocating parts, including the connecting rods, be so constructed as to be as light as possible. However, these necessarily light connecting rods must withstand heavy alternating loads. These connecting rods are subjected to the compressive stress originating primarily in the gas pressure of the explosion and compression strokes. These same connecting rods are also subject to tensile loads imposed by the inertia of the pistons and the associated parts.

Each of FIGURES 1 and 2 shows a composite connecting rod in which the tension supporting member is a steel wire or rod. The compression supporting member is a casting of zinc or aluminum or their alloys which is easily castable in conventional die casting machinery. This casting is provided at one end with a piston pin bearing receiving member and at the opposite end with a crankshaft bearing receiving member. This casting or compression supporting member surrounds the steel wire or rod tension supporting member and may be metallurgically bonded thereto.

The central portion of this tension supporting member passes around the piston pin bearing receiving member. The ends of the tension supporting member project a substantial distance beyond the crankshaft bearing receiving member. These extended portions of the tension supporting member are parallel to each other and to the axis of the connecting rod. These extended portions of the tension supporting member are threaded to receive the nuts which retain the bearing caps.

The central portion of the tension supporting member may be flattened in the vicinity of the piston pin bearing receiving member to better support this member. This structure is clearly shown in both FIGURE 1 and FIGURE 2.

The structure shown in FIGURE 2 differs from that shown in FIGURE 1 in that the wire or rod tension supporting member is crossed upon itself adjacent the piston pin bearing receiving member. At this location the wire or rod should be flattened to limit the thickness of the entire structure and, hence, its weight.

I claim as my invention:

1. An internal combustion engine part comprising a steel rod tension supporting member capable of resisting tensile stress and a compression supporting member fabricated from a metal selected from the group of metals consisting of aluminum, zinc, aluminum alloys and zinc alloys and capable of resisting compressive stress, said compression supporting member terminating at one end in a piston pin bearing receiving member and at the other end in a crankshaft bearing receiving member, said steel rod tension supporting member including a central portion which passes around the piston pin bearing receiving member and further including ends which extend a substantial distance beyond the compression supporting member and are threaded to receive connecting rod cap nuts, said compression supporting member enclosing substantially all of the steel rod tension supporting member except the threaded portion.

2. The structure recited in claim 1, in which the portion of the tension supporting rod which passes around the piston pin bearing receiving member is flattened.

3. The structure recited in claim 1, in which the portion of the tension supporting rod which passes around the piston pin is flattened and crossed upon itself.

References Cited by the Examiner

UNITED STATES PATENTS 760,333    5/1904    Hardenbrook et al.

FOREIGN PATENTS 951,201    4/1959    France.
218,099    7/1924    Great Britain.
554,696    1/1957    Italy.

BROUGHTON G. DURHAM, *Primary Examiner.*